United States Patent Office 3,481,382
Patented Dec. 2, 1969

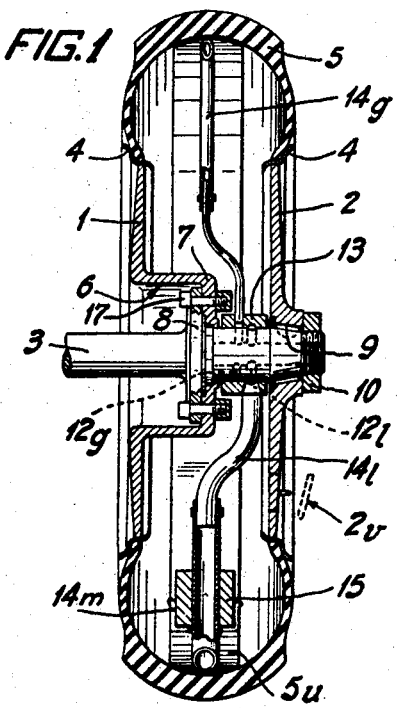

3,481,382
ELASTICALLY-TIRED WHEEL-RESERVOIRS
Emile Bobard, 17 Rue de Reon, Cote d'Or,
Beaune, France
Filed Mar. 6, 1967, Ser. No. 621,004
Claims priority, application France, Mar. 7, 1966,
52,335
Int. Cl. B60b 9/22
U.S. Cl. 152—9     10 Claims

ABSTRACT OF THE DISCLOSURE

An elastically-tired reservoir-wheel for vehicles including a tubular axle extension mounting two tire bead groove-carrying wheel disks, a collar freely rotatable on the axle extension between the wheel disks and communicated to the interior of the axle extension; two diametrically opposed radial tubes on the collar; a weight removably mounted on one tube, operative when in place to maintain the tubes in a vertical condition irrespective of rotation of the wheel to allow liquid and gas to be separately introduced into and removed from the reservoir defined within a tire in place on the wheel through the axle extension, collar and respective tubes while the tire remains in place on the wheel. Sleeves to protect the interior of the tire from the stored fluids are shown.

---

This invention relates to improvements to elastically-tired wheel-reservoirs intended for vehicles, and tractors in particular.

It is well known that the use of elastically-tired wheel-reservoirs on tractors raises certain difficulties for the following reasons:

Such wheels are in part inseparable from their axles.

Tractors equipped with such wheels have a track width greater than the customary track width.

Lastly, the systems, used for connecting and/or disconnecting the external fittings connected to the gas and liquid supply devices are not very practical to use.

It is the object of the present invention to overcome the drawbacks and to accordingly provide an elastically-tired reservoir-wheel designed for mounting on a vehicle and which can be used as a reservoir when the vehicle is running.

A reservoir-wheel according to the invention consists of two wheel-discs which form therebetween a gas and liquid reservoir and each of which is formed with a groove for receiving an elastic tire bead, axial communication means being provided to cooperate with radial means whereby to permit a circulation of gas and liquid at will, notably when the vehicle is running.

In accordance with this invention, the axial communication means are formed in an axle extension having leak-tight means for mounting and driving the outer wheel-disc, further means being provided for sealingly mounting and driving the inner wheel-disc and said extension on the axle of the vehicle.

Preferably, the means for mounting the inner wheel-disc on the axle consist of a flange formed on the central portion of the disc for securing thereof to a shoulder formed on the axle. In order also to reduce as much as possible the track width of such a wheel, the inner wheel-disc is bowl-shaped and has its tire bead groove offset inwardly, i.e., away from the outer end of the axle, whereby the overall dimensions of the wheel are for all practical purposes comparable to those of a conventional wheel with no offset.

Another feature of the invention is that the axle extension is rigidly united with the inner wheel-disc, whereby the wheel can be fitted on or removed from the axle in similar fashion to a conventional wheel.

Yet another feature of the invention is that the axial communication means are designed in the form of closure means.

Preferably, the communication means include sliding members forming simple and reliable closure means, whereby instant connections and disconnections can be effected regardless of the quantities of gas and liquid contained in the wheel.

The description which follows with reference to the accompanying nonlimitative exemplary drawings will give a clear understanding of how the invention can be carried into practice and will disclose still further features and particularities thereof.

In the drawings:

FIGURE 1 shows in cross-section a wheel-reservoir according to the invention.

FIGURES 2 and 3 show in longitudinal section a closure device usable with the communication means according to the invention.

FIGURE 4 shows in cross-section a wheel-reservoir equipped internally with a protective sheath.

FIGURES 5 and 6 are sectional views of two alternative embodiments of the protective sheath.

Referring first to FIGURE 1, there is shown thereon a tractor wheel comprising an inner wheel-disc 1 and an outer wheel-disc 2 mounted on a stub-axle 3 forming an extension of a tractor driving axle, which discs are formed on their peripheries with grooves 4 into which engage the beads of an elastic-tire 5.

In its central region disc 1 is formed into a cylindrical bowl 6 bounded by a flange 7 which is secured by nuts and bolts 17 to a shoulder 8 formed on the axle, at the root of stub 3.

In its central region, disc 2 is formed into a hub having a conical bore 9 spigoted and keyed to the matching tip of the stub-axle, a seal being fitted therebetween and the hub being secured on the stub-axle by a nut 10.

Stub-axle 3 is additionally formed with a blind bore 11 into which have port two sets of radial holes 12l and 12g.

Loosely mounted on the stub-axle, between the central regions of the two discs, is a sleeve 13 embodying two collector grooves formed respectively opposite the holes 12l and 12g and communicating with a tube 14l and a tube 14g, suitable seals being fitted on the various elements.

It will be noted that these tubes extend respectively downwardly and upwardly and that, because of the offset of bowl 6, the sleeve is positioned substantially rightwardly of the centerplane of tire 5, each of tubes 14 being formed with two opposite bends therein so that their terminal portions, which are made of flexible material, lie substantially in the centerplane of the tire.

Lastly, a counterweight 15 is mounted proximate the end of the flexible portion of tube 14, inside the elastic tire.

It will readily be appreciated from the foregoing description that the two tubes 14, the sleeve 13 and the two sets of radial holes form radial means permitting opposite circulations of gas and liquid within the space bounded by the wheel-discs and the tire.

For since sleeve 13 is loosely mounted on the stub-axle, counterweight 15 will suffice to prevent this radial system from rotating, the tube ends being retained at the top and bottom dead centers of the tire, respectively. All that is then necessary is to engage into bore 11 two coaxial tubes the ends of which have port substantially opposite the two sets of holes, to ensure flows of gas and liquid regardless of whether the vehicle is stationary or running.

Since the wheel may not be used as a reservoir for long periods, however, counterweight 15 is demountable to enable the fluid circulation system to be released; the radial tubes can then rotate with the wheel, thereby avoiding wear on the sealing rings of sleeve 13.

Accordingly, flexible tube 14 includes a case 14m which is accessible through a plug inspection hole 2v in wheel-disc 2 and in which can be housed counterweight 15, which counterweight is therefore devised as two semi-circular shells.

It is to be noted that with the counterweight removed, the wheel continues to offer, when running, the advantages afforded by the fact that communication with the inflator is maintained at all times.

It should be noted further that, by reason of the offset of groove 4 of disc 1 in relation to flange 7, the center-plane through the tire is practically not offset at all in relation to the stub-axle of the vehicle.

Lastly, such wheel-discs permit ready fitting and removal of the tire and the wheel, since all that is necessary is to loosen nut 10 and to then remove disc 2, sleeve 13 and tire 5, after which the cap-nuts can be unscrewed from the studs used to secure flange 7 to shoulder 8, and wheel-disc 1 pulled off the driving axle.

Reference to FIGURE 4 shows that a stub-axle 27 similar to stub-axle 3 can be sealingly fixed with advantage to inner wheel-disc flange 7 to form a wheel similar to a conventional wheel, with flange 7 being provided with threaded studs to permit securing the wheel by means of external nuts to a circular plate 8a rigid with the axle end.

It will be noted that the need to be able to drain the liquid supply could result in light chafing of the flexible portion of tube 14l against inner wall 5.

To avoid wear on the tire as a result of this light chafing, the tire may have secured thereto, by means of adhesive for example, a chafing band 5u.

Similarly, the inner tire wall may be protected by bonding thereto a sheet of flexible material, or by coating it with butyl or some similar substance.

Further, the liquid contained in such a wheel could be chemically aggressive. In order therefore to avoid detrimental oxidation, the stub-axle and the sleeve may be made of stainless metals, while the inner surfaces of the wheel-discs and the elastic tire (see FIGURES 4 to 6) may be protected by a sheath 51 made of a plastic and elastic material.

Sheath 51 is formed with an annulus portion 52 designed to fit inside the tire and extended by two circular flanks 53 each of which embodies, in its central region at least, an annular bead 54 adapted to leaktightly hug the stub-axle.

In order to enable such a sheath to additionally provide leaktightness of the wheel in the event of partial separation of the tire from the wheel rim, it is preferably devised in the form of two circular plastic flanks 55 having their edges 56 welded together (see FIGURE 5).

In cases where the inner and outer wheel discs are protected by the very nature of the materials of which they are made, or by a suitable coating, the elastic tire itself is preferably protected by a plastic sheath 57 shaped as an annular segment with a wide opening along its periphery adjacent the axle and formed with gripping flanges 58 for restraining the tire beads (see FIGURE 6).

Such a sheath can easily be manufactured by:

Continuously extruding a ringed helicoid strip made of elastic material,

Cutting off a coil from the strip, and

Welding the terminal edges of the coil in a radial plane.

No special difficulty is involved in fitting the sheath 57, the procedure being the same as when fitting a tire inner tube. In order however to facilitate fitting the sheath 51, and in order especially to avoid trapping air between the sheath and wheel-discs 1 and 2, the latter are formed with ordinary vents 59.

In addition, in order to facilitate wheel fitting operations or the inspection of the fluid circuit elements (e.g., the inflator compressors or the sprayer), it may prove very convenient to segregate certain parts of the circuits and the wheel in particular. The invention accordingly provides for a closure device 40 (see FIGURES 2 and 3) consisting merely of two pistons 41, 42, devised in the form of a cylindrical slide-valve. These pistons may be located at the end of the fluid lines, with seals 43 being provided in the stub-axle bore to permit bodily sliding of the device and either flow of fluid into the wheel or segregation of the latter from the other parts of the circuit.

Obviously, such a closure device may equip either stub-axles rigidly united with the wheel drive shaft (FIGURE 1), or stub-axles rigid with their inner wheel disc (see FIGURES 2 to 4). In the latter case, the wheel shaft may be formed with an axial bore therethrough to permit terminal movement of piston 41.

It goes without saying that many changes or substitutions may be made in the forms of embodiment hereinbefore described without departing from the spirit and scope of the invention. More particularly, the tubes 14 could be kept substantially vertical:

Either by magnetic or electromagnetic means such as a pole-face cooperating through the tire with another pole-face fixed to gas tube 14g, Or by a container secured to tube 14l and designed to be filled, in its lower position, with lead shot and to be emptied in its upper position through a pipe insertable through a small inspection hole in the wheel-disc; alternatively, this pipe could be caused to communicate with an annular container mounted about sleeve 13 for receiving the lead shot.

In the wheel as shown in the drawings, only the parts of the radial means (radial passages) that open directly into the axial means are driven in rotation and sleeve 13 (by virtue of the grooves provided on the said sleeve or on the axle or on the spindle) ensuring a permanent communication between the radial passages and radial conduits 14g, 14l which are held in vertical position.

These radial passages 12l, 12g are made in the axle or in the spindle.

Such a disposition of the gas and liquid conduits is advantageous for example in agriculture, since such a wheel can constitute the drive wheel of a conventional tractor and ensure, in addition, the conveyance of a substantial amount of liquid (which, taking into account the diameter of tractor drive wheels, can be of the order of 500 liters). This liquid, particularly liquid fertilizer, can conveniently be distributed without difficulty for the tractor movement, because of gas injection into the wheel. This obviates the towing of a tank, which is often difficult (e.g., in shrubbery).

The wheel described in respect to FIGURE 4 constitutes an automatic device for a vehicle that can be mounted or removed in a manner that is practically similar to that for ordinary pneumatic tires on a rim, on a journalled axle of a vehicle.

The valve device for closing the wheel reservoir described in respect to FIGURES 2 and 3, allows quick and reliable cut off at any time, of the air and liquid reserves that it contains. If it is desired, the external implementing pipes can be taken off the wheel when it is not in use for spreading operations.

The antiabrasion belt 5u (FIGURE 1) and 51–58 (FIGURES 4–6) allows, through protection of the tire against friction by the radial conduits, practically complete filling and emptying of the wheel.

The characteristics of the FIGURES 4–6 constructions allow use of a conventional tire containing the sheath and nevertheless the transportation of a corrosive liquid, since the tire is protected against the chemical effects that this liquid might cause.

The use of reservoir wheels does not require, in course of operation, any maneuvering of closure means 41 and 42.

These manipulations are effected when the vehicle has halted and the group of piston valves (which comprise a unit for simultaneous control of opening and closing of the axial conduits) is actuated manually when the vehicle has stopped.

In the drawings, the embodiment of FIGURES 2 and 3 comprises a wheel spindle of the type as in FIGURE 4. Sleeve 13 is also shown in the said FIGURES 2 and 3. The use of reservoir wheels is especially advantageous in agriculture because it eliminates the towing of a tank and allows conveyance of a quantity of liquid whose center of gravity, at a maximum height, is straight above the axle.

But to ensure conveyance and economical use of a liquid in a field under cultivation, it is advisable to use wheels (especially the drive wheels of a tractor) whose diameter is sufficiently large to offer an acceptable capacity.

The wheel of the drawings, intended for mounting on a journalled axle is perfectly suited to such utilization. In the course of transport on a road, the disposition of FIGURE 2 is used, and then in the field, that of FIGURE 3.

The efficient and economical use of store of liquid in a field requires complete filling and discharging of the reservoir wheel with a liquid (fertilizer, fungicide, etc). These operations require separate and opposed flows of gas and liquid, from the uppermost and lowermost points respectively of the reservoir wheel. Moreover, the usual spreading of liquid fertilizer at low pressure can be sustained simply by continuous injection into the wheel of compressed air necessary for constant maintenance of an internal pressure in the tire, in proportion to the discharge of liquid.

What I claimed is:

1. In combination: a stub axle; an axially inner and an axially outer radially extending rim secured to said stub axle at locations axially spaced from one another; circumferential groove means on said rims for receiving respective beads of an elastic tire to thereby define, between the rims, an elastically tired wheel reservoir; means defining a first passageway extending axially within said stub axle and communicating through the exterior of the stub axle beyond one of said rims; said first passageway also communicating, radially outwardly, through the exterior of the stub axle between said rims; means defining a second passageway extending axially within said stub axle and communicating through the exterior of the stub axle beyond said one of said rims; said second passageway also communicating, radially outwardly, through the exterior of the stub axle between said rims; a tubular sleeve received upon said stub axle between said hubs and covering both said first and said second passageways, said stub axle being rotatable about its longitudinal axis, relative to said tubular sleeve; means defining a first opening radially through said sleeve; a first conduit secured to said tubular sleeve in communication with said first opening and extending radially outwardly therefrom, between said rims; means defining a second opening radially through said sleeve; a second conduit secured to said tubular sleeve in communication with said second opening and extending radially outwardly therefrom, between said rims; said first and second conduits having distal ends spaced angularly of one another with respect to the longitudinal axis of said stub axle; and means defining a first and a second circumferential groove between said sleeve, internally thereof, and said stub axle, exteriorly thereof between said rims; said first groove communicating said first passageway with said first opening and said first conduit irrespective of rotation of said stub axle with respect to said sleeve; said second groove communicating said second passageway with said second opening and said second conduit irrespective of rotation of said stub axle with respect to said sleeve; and counterweight means on said first conduit, distally of said stub axle, for maintaining said first conduit distal end downwardly irrespective of rotation of said stub axle with respect to said sleeve.

2. The combination of claim 1 further including: an elastic tire having two axially spaced, circumferentially extending beads; said beads cooperatively engaging respective of said grooves on said rims and mounting said tire on said rims.

3. The combination of claim 2 wherein said tire, internally thereof, axially between said beads, has antiabrasive strip means secured thereon and extending circumferentially thereof radially outwardly of the distal ends of said first and second conduits.

4. The combination of claim 3 wherein said strip means extends axially of said tire, internally thereof, sufficiently to extend between said beads and said grooves.

5. The combination of claim 3 wherein said strip means constitutes a sheath substantially covering the entire tire, internally thereof and extending radially inwardly in two flank portions over said rims, to adjacency with said stub axle.

6. The combination of claim 3 wherein said strip means comprises two axially abutted circumferentially extending halves of plastic sheathing and including a circumferential seam means welding said halves together.

7. The combination of claim 1 further including valve means on said stub axle for closing off communication of respective of said first and second passageways with respective of said first and second openings.

8. The combination of claim 7 wherein said stub axle is tubular; and further comprising: means closing the opposite end of said stub axle; a cylindrical slide valve received in said stub axle and being slidable from exteriorly of said stub axle between two positions; first port means through said slide valve; second port means through said slide valve; said first and second port means, when said slide valve is in said first position, respectively communicating between said first passageway and said first opening and between said second passageway and said second opening, said slide valve when in said second position closing off communication between said first and second openings, on the one hand, and the exterior of the stub axle one end.

9. The combination of claim 1 wherein said stub axle constitutes an independent spindle; and further including means on said spindle for securing said spindle to a vehicle drive axle.

10. The combination of claim 1 wherein said stub axle comprises an integral part of a vehicle drive axle.

References Cited

UNITED STATES PATENTS

| 2,203,564 | 6/1940 | Fransworth | 152—330 |
| 2,339,381 | 1/1944 | Crowley | 152—330 |
| 3,169,581 | 2/1965 | Cummins | 152—9 |

ARTHUR L. LA POINT, Primary Examiner

C. B. LYON, Assistant Examiner

U.S. Cl. X.R.

141—138; 152—330